(12) United States Patent
Baer et al.

(10) Patent No.: US 10,323,938 B2
(45) Date of Patent: Jun. 18, 2019

(54) METHOD FOR CALIBRATING A MEASURING DEVICE

(71) Applicant: CARL MAHR HOLDING GMBH, Goettingen (DE)

(72) Inventors: Goran Baer, Stuttgart (DE); Christof Pruss, Ostfildern (DE); Wolfgang Osten, Stuttgart (DE)

(73) Assignee: Carl Mahr Holding GmbH, Goettingen (DE)

( * ) Notice: Subject to any disclaimer, the term of this patent is extended or adjusted under 35 U.S.C. 154(b) by 161 days.

(21) Appl. No.: 15/310,697

(22) PCT Filed: May 13, 2015

(86) PCT No.: PCT/EP2015/060678
§ 371 (c)(1),
(2) Date: Nov. 11, 2016

(87) PCT Pub. No.: WO2015/173346
PCT Pub. Date: Nov. 19, 2015

(65) Prior Publication Data
US 2017/0074648 A1   Mar. 16, 2017

(30) Foreign Application Priority Data
May 13, 2014 (DE) .......... 10 2014 209 040

(51) Int. Cl.
*G01B 11/02* (2006.01)
*G01B 21/04* (2006.01)
*G01B 9/02* (2006.01)

(52) U.S. Cl.
CPC ....... *G01B 21/042* (2013.01); *G01B 9/02072* (2013.04)

(58) Field of Classification Search
CPC ..... G01B 11/00; G01B 11/002; G01B 11/005; G01B 21/042; G01B 9/02072; G01B 2290/45; G01Q 40/02
(Continued)

(56) References Cited

U.S. PATENT DOCUMENTS 4,437,151 A * 3/1984 Hurt .................. G01B 21/042
33/503
4,819,195 A * 4/1989 Bell .................. G01B 7/008
318/632
(Continued)

FOREIGN PATENT DOCUMENTS

CN   1554011 A   12/2004
CN   1611915 A   5/2005
(Continued)

OTHER PUBLICATIONS

International Search Report in corresponding International Application No. PCT/EP2015/060678, dated Jan. 7, 2016, 12 pages.
(Continued)

*Primary Examiner* — Tarifur R Chowdhury
*Assistant Examiner* — Jonathon Cook
(74) *Attorney, Agent, or Firm* — Fitch, Even, Tabin & Flannery LLP (57) ABSTRACT

The invention relates to a method for calibrating a measuring device, comprising the following steps: moving, with finite accuracy and thus with positioning error, to various points that lie in a testing volume of the measuring device and that can be characterized by spatial and/or angular coordinates, generating measurement signals at the respective points, and determining parameters of a computing model of the measuring device from the measurement signals and the spatial and/or angular coordinates. The method is characterized in that a coordinate system to which
(Continued)

the coordinates of the points of the testing volume relate is defined from points moved to with error, by associating predetermined coordinate values with exactly six coordinates of three points.

22 Claims, 2 Drawing Sheets

(58) Field of Classification Search
USPC .......................................................... 356/498
See application file for complete search history.

(56) References Cited

U.S. PATENT DOCUMENTS

| | | | |
|---|---|---|---|
| 5,636,025 | A | 6/1997 | Bieman et al. |
| 2003/0066202 | A1 | 4/2003 | Eaton |
| 2005/0030550 | A1 | 2/2005 | Nahum |
| 2005/0166413 | A1 | 8/2005 | Crampton |
| 2006/0221350 | A1 | 10/2006 | Murphy et al. |

FOREIGN PATENT DOCUMENTS

| | | |
|---|---|---|
| CN | 1812868 A | 8/2006 |
| CN | 101165454 A | 4/2008 |
| DE | 102006057606 A1 | 5/2008 |
| WO | 02084209 A1 | 10/2002 |

OTHER PUBLICATIONS

Liesner, Jan, "Zum Einsatz räumlicher Lichtmodulatoren in der interferometrischen Wellenfrontmesstechnik" Berichte Aus Dem Institut für Technische Optik Der Universität Stuttgart, vol. 55, Nov. 24, 2006, pp. 39-41, CP00274353, Stuttgart, ISBN: 3923560540.

Office Action in corresponding German Application No. 10 2014 209 040.7, dated Jul. 21, 2017, 7 pages.

First Office Action and Search Report in corresponding Chinese Application No. 2015800244687, dated Jul. 23, 2018, with English translation (15 pages).

\* cited by examiner

METHOD FOR CALIBRATING A MEASURING DEVICE

CROSS REFERENCE TO RELATED APPLICATIONS

This patent application is the national phase of PCT/EP2015/060678 filed May 13, 2015, which claims the benefit of German Patent Application No. 10 2014 209 040.7 filed May 13, 2014.

TECHNICAL FIELD

The present invention relates to a method of calibrating a measuring device. Such a method has been known from the dissertation "Zum Einsatz räumlicher Lichtmodulatoren in der interferometrischen Wellenfrontmesstechnik" [For the use of spatial light modulators in interferometric wavefront measuring technology], by J. Liesener, University of Stuttgart, 2006, and also from publication DE 10 2006 057 606 B4 for an interferometer used as the measuring device.

BACKGROUND

However, the invention presented hereinafter is not restricted to interferometers but can also be used in other measuring devices, wherein various points of a testing volume are moved to in order to generate one or more measurement signals at those locations. In doing so, the testing volume is the quantity of all points which can be moved to and in which measurement signals can be generated. Examples of such measuring devices a deflectometric measuring devices and tactile measuring devices (coordinate measuring devices). Hereinafter, such points will also be referred to as measuring positions.

In this patent application referring interferometers, a distinction is made between so-called classic or conventional interferometers and so-called Tilted Wave Interferometers. The Tilted Wave Interferometer (TWI) is a measuring device for measuring optically smooth, aspherical and freeform surfaces that—different from conventional interferometers—do not work with a test wave (that is emitted by a single light source) but with a plurality of test waves that are tilted relative to each other, said test waves being emitted by various light sources.

For calibrating a TWI the subject matter of publication DE 10 2006 057 606 B4, moves toward various points, that are located in a testing volume of this measuring device and are distinguishable by spatial and/or angular coordinates, with finite accuracy and thus are subject to positioning errors. The points can be distinguished by coordinates in so far as the coordinate system required for the allocation of values of the coordinates during the subsequent measuring process is defined only by the calibration. Measurement signals are generated in the respective points, and parameters of a mathematical model of the measuring device are determined based on the measurement signals and the spatial and/or angular coordinates.

Among other things, interferometers are used for measuring optically smooth surfaces. In so doing, an optically smooth surface is a specular reflecting boundary surface or a smooth, refractive boundary surface of a transparent object.

In the course of the interferometric measurement of such boundary surfaces, a test wave (object wave) and a reference wave coherent with respect to said test wave are generated. The test wave and the reference wave are preferably generated from coherent light of one and the same light source, this being accomplished with the use of a beam splitter, for example. The test wave is reflected or refracted by the boundary surface and subsequently superimposed with a reference wave on a detector, for example a light-sensitive chip of a camera, wherein said reference wave has not experienced any interaction with the object or is a known modified copy of the test wave as is the case, for example, in shearing interferometry. The optical path lengths passed by both waves up to their superimposition on the detector depend on influences of the respective beam guide in the interferometer and the influence of the object on the test wave. The resulting interference image is thus undesirably ambiguous. The objective of a calibration is the elimination of the influence of the beam guide of the interferometer.

To be able to eliminate this influence it has been known to measure objects to be measured (test samples) in so-called null test configurations, which adapt the rays in such a manner that they are again incident perpendicularly on the sample or compare them to the highly accurate known master surfaces. For example, the adaptation is accomplished by a CGH or by a refractive compensation optics. The influences of the beam guide then occur on the master surface, as well as on the sample, in identical form and can thus be basically eliminated during the evaluation due to the formation of a difference. The path length differences that remain with such an evaluation then only provide an image of the deviations of the sample from the master surface. This type of calibration is also referred to as null test and is suitable, in particular, for spherical samples because spherical master surfaces can be provided with comparatively minimal effort.

Null tests on aspheres require special refractive or diffractive optics adapted to the shape of the aspheres which is undesirable because of the manufacturing expense connected therewith.

The aforementioned known method works without such master surfaces. In that case, the calibration is based on a description of the interferometric measuring devices, namely in the form of the Black Box mathematical model. This mathematical model requires a precise knowledge of the optical paths in the interferometer. This model, or the description of the interferometer in the form of the Black Box mathematical model, allows a calculation of the optical path length—OPL) existing between the light source and the detector for any conceivable light beam that passes through the testing volume and, in so doing, is reflected, refracted or diffracted on the object to be measured.

For calculating these path lengths, the OPLs are described by multidimensional polynomials. The polynomial coefficients acting as model parameters are initially calculated for an ideal interferometer. Deviations (aberrations) of the real interferometer from the ideal interferometer are determined by measurements performed on a known reference object, and the calculated polynomial coefficients are calibrated therewith. Here, a calibration is understood to mean an adaptation of the coefficients, this being accomplished in that the OPLs in the real interferometer can be correctly calculated by the multidimensional polynomials with adapted coefficients. Hence, the objective of the calibration is to determine the polynomial coefficients in such a manner that they allow the most accurate possible description of the optical paths in the real interferometer. In so doing, the reference object is measured at several points (measuring positions) in the testing volume, and the Black Box parameters (i.e., the polynomial coefficients) of the real interferometer are determined therefrom by means of an optimizing process.

Upon completion of the calibration it is possible with the aid of the Black Box model to correctly calculate each and every optical path in the interferometer. Because the polynomial coefficients are known, there results a description of the interferometer that allows the calculation of the optical path length (OPL) from the source to the detector—for each conceivable light beam in the testing volume—when the influence of the object to be examined is known. Consequently, the influence of the interferometer on the measurement result can be determined and be mathematically eliminated as a result.

In order to be able to determine the Black Box parameters during the calibration, the optimization problem to be solved with the optimizing process must be clearly defined. On the one hand, this means that the available degrees of freedom for optimization should be such so as to not form any ambiguities, i.e., that it is not possible to describe the same condition with different parameter sets.

On the other hand, however, there must be sufficient degrees of freedom to allow the algorithm to find the correct solution; and this solution must be attainable within the available solution range. In so doing, the solution range is understood to mean the quantity of all possible values of the Black Box parameters and the polynomial coefficients, respectively.

Furthermore, the information that acts as the input data set for calibration must be selected in such a manner that there is only one possible, namely physically relevant, solution. Otherwise, there is the risk that, instead of the physically correct solution, another local minimum is found. The previous calibration method exhibits a few shortcomings in this regard, these potentially resulting in flawed calibrations.

Against this background, the object of the present invention is the further improvement of the method mentioned hereinabove.

SUMMARY

This object is achieved in that a coordinate system, to which relate the coordinates of the points of the testing volume, is defined by measuring positions that were moved to in error, in that exactly six coordinates of three or more measuring positions are allocated predetermined coordinate values. These may be, for example, the three spatial coordinates x, y and z of a first measuring position in the nominal position (0/0/0) (for illustration purposes, without units), furthermore the x-coordinate and the y-coordinate in a second measuring position having the nominal position (0/0/1) and the y-coordinate in a third measuring position having the nominal coordinates (1/0/0).

It is true, the known method has also used secondary conditions for the coordinates of the measuring points; however, in that case, these coordinates were included as free variables in the solution range of the calibration.

In contrast, the six predetermined coordinate values of the present invention are no longer viewed as variables but as constants. Due to this allocation, the coordinate system is determined with a measuring uncertainty of zero and thus determined unambiguously.

An advantage of the new solution in an interferometer is, for example, a clearly improved convergence of calibration, i.e., a convergence that is less severely constrained than that of prior art. This is the case, in particular, when adjustment errors in the setup include a tilt in the test wavefront. Such a tilt is frequently not directly recognizable because it can be compensated for by the reference wave.

This is different from the conventional TWI calibration in that the secondary conditions of the equation system which define the global coordinate system were changed.

The difference of the calibration for calibrating a classic interferometer is that it describes the entire interferometer with the use of a Black Box model. This is applicable not only to beams in the null test but also to any OPL through the interferometer, which results in an increased measuring accuracy, as well as in reduced requirements regarding any adjustment.

As has already been the subject matter of publication DE 10 2006 057 606 B4, the invention allows a calibration of the tilted wave interferometer or also of a conventional, area-measuring interferometer that works with only one test wave, in which case the invention can work without null tests that can be performed only with master surfaces.

In other words: The advantage of the known method that the reference objects used during calibration may differ from the measured objects that are to be measured later with the calibrated interferometer, will remain to be used in the new calibration. In particular, the reference objects need not have master surfaces that, under certain circumstances, must be manufactured specifically for a measured object.

In the case of the TWI this (new) way of calibration is the only known possibility to assure the function of the device with the required accuracy. This is a substantial advantage compared to the subject matter of publication DE 10 2006 057 606 B4. In the case of a conventional interferometer without tilted test waves, the advantage of the calibration according to the invention compared with a conventional null test calibration—which, for example, uses a three-position test [E., Jensen A.: Absolute Calibration Method for Twyman-Green Wavefront Testing Interferometers, J. Opt. Doc. A M 63 (1973), p. 1313A)] or Random Ball test—is that the calibration is valid not only for beams in the null test but also for beams deviating therefrom. This allows the elimination of retrace errors in the measured result, so that a high accuracy with simultaneously fewer requirements of the sample adjustment can be achieved and weak spheres can also be measured.

In the known calibration of a classic interferometer a reference surface is measured in the interferometer in order to deduce therefrom the optical paths lengths though the system. This is necessary in order to distinguish these from the path length changes caused by the sample. It is desirable that only the latter be reflected in the measurement signal. Here, it is assumed that all beams on their way to the sample and back therefrom take the same path through the interferometer. This approach, however, applies only to samples that are measured with the null test, are adjusted highly accurately and display only minimal deviations from their nominal form. Differences in the propagation of the beam between the going and the retuning path form the already mentioned retrace errors.

Different therefrom, the present invention works with a description of the total interferometer by using Black Box models. These models are applicable not only with beams in the null test but also with any beams through the interferometer, which leads to increased measuring accuracy, as well as to reduced requirements for adjustment. In the calibration of a classic interferometer as the measuring device, the method according to the invention allows a calculation and thus a mathematical correction of the retrace errors that are formed due to deviations from the null test configuration. This allows the measurement of slight aspherical or free forms in the non-null test, it relaxes the accuracy requirements of adjustments and allows the measurement of surfaces displaying greater deviations from the nominal form.

The advantage over the conventional TWI calibration method is that a far better convergence can be attained. The convergence of the known calibration is ensured only for systems that are adjusted so accurately that the remaining deviations from the nominal state in the entire system and for all light sources are smaller than five wavelengths.

Furthermore, due to the constrained parameter space, aberrations cannot be calibrated with medium frequencies, as a result of which the overall accuracy of the calibration is made worse. A far better convergence can be achieved with the calibration approach presented herein. On the one hand, this also allows the calibration of systems that are not as well adjusted. Simulations have shown that deviations of up to 50 times the wavelength and more can still be calibrated, as a result which adjustments can be made clearly more easily. Furthermore, when modeling the interferometer with the aid of Black Boxes in which the optical wavelengths occurring inside the interferometer can be described by polynomials, it is possible to increase the polynomial order of the Black Boxes so that a more accurate calibration can be achieved.

Another embodiment according to the invention is distinguished in that at least a part of the reference objects and measuring positions used during calibration is determined previously in such a manner that a measurement signal of the area/panel detector generated in a reciprocal effect of the light of several light sources with a reference object comprises contributions of several light sources; and that the measuring positions in the testing volume represent nodal points of an imagined, coherent graph that consists of nodal points and edges, wherein two nodes are connected by an imagined edge precisely whenever the measurement signals generated in the two nodes contain contributions of at least one common light source, and furthermore, whenever any light source of the light sources provides at least one contribution to a measurement signal to which at least one other light source provides a contribution; and that a measurement signal of the area/panel detector that comprises several individual detectors is composed of the signal contributions of several individual detectors, and that the measuring positions in the testing volume represent nodal points of an imagined, coherent graph that consists of nodes and edges, wherein two nodal points are connected by one imagined edge precisely whenever the measurement signals which are generated in the two nodes contain signals contributions of at least one common individual detector, and, furthermore, each individual detector of the area/panel detector provides at least one contribution to a measurement signal. It is preferred that, in addition to the measurement signal, at least one additional individual detector provides a contribution, and that, furthermore, each individual detector provides a contribution to a measurement signal, to which at least one additional individual detector provides a contribution.

A further solution according to the invention provides that one or more reference objects are used, whereby these can be used in different—preferably spaced far apart—positions in the testing volume. For example, two reference objects can be used that have curved surfaces with differently large radii of curvature. Another example would be the use of a computer-generated hologram that generates several, differently curve wavefronts. Another example would be a known aspherical or freeform surface.

By means of the additional calibration objects it can be ensured that the correct solution will be found and that the measured result does not exhibit a scaling error.

Additional advantages can be inferred from the description and the appended figures.

It is understood that the aforementioned features and those mentioned hereinafter that are still to be explained can be used not only in the respectively stated combination but also in other combinations or as stand-alone features, without leaving the framework of the present inventions.

BRIEF DESCRIPTION OF THE DRAWINGS

Exemplary embodiments of the invention are represented in the drawings and will be explained in greater detail hereinafter. Respectively in schematic form, they show in FIG. 1 an interferometer as an exemplary embodiment of a measuring device according to the invention.

DETAILED DESCRIPTION

Hereinafter follows a description of the invention with reference to an interferometer being the example of a measuring device that can be calibrated with the method according to the invention. However, as has already been mentioned, the invention can also been employed for the calibration of other measuring devices, wherein—also in that case—a movement with finite accuracy and thus subject to positioning errors to various points distinguishable by spatial and/or angular coordinates located in a testing volume of the measuring device takes place, and measurement signals are generated in the respective points, and parameters of a mathematical model of the measuring device are determined from the measurement signals and the spatial and/or angular coordinates. Examples of such measuring devices have been mentioned farther above.

Figure 1:
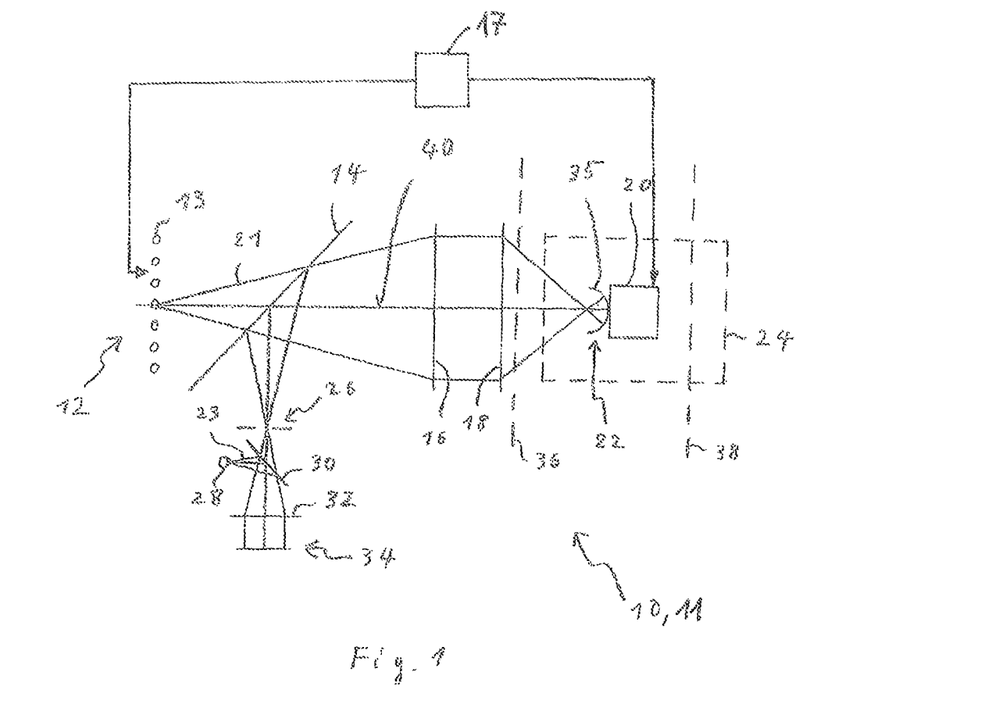

The measuring device 10 shown in FIG. 1 is an interferometer comprising a point light source array 12 of light sources 13, a beam splitter 14, a collimator 16, an objective lens 18, a positioning unit 20 for moving a measured object 22 in a testing volume 24 of the interferometer, a diaphragm 26, a reference light source 28, another beam splitter 30, an imagining optics 32 and a detector 34 in the form of a camera comprising photosensitive pixels. The measured object used for calibration will also be referred to as calibration object hereinafter.

During calibration, the difference of the optical wavelengths of various beams 21, 23 of the sources 13, 28 is interferometrically measured in order to obtain input data for calibration. In order to calibrate the entire testing volume, the reference object—which is preferably a sphere 35 or a planar mirror—is moved with the use of the positioning unit 20 in the testing volume and measured at different locations. The positioning unit that is used for moving into the calibration positions comprises a finite, absolute positioning accuracy in the space. Typically, this positioning accuracy is within the range of more than one micrometer, which is approximately two decimal powers above the accuracy required for the calibration.

A clearly higher positioning accuracy would involve great technical effort and is not desirable for reasons of costs. This has the result that each calibration measurement uses, in addition to information that is used for calibrating the measuring system, at all times also a component that has formed due to faulty positioning.

This results in an undesirable ambiguity. In order to still be able to completely calibrate the system, it is necessary to differentiate between the system aberrations that are to be calibrated and the influence of the faulty positioning. This means that the algorithms used during calibration must also calculate the faulty positioning of the reference sphere 36 as an intermediate result in order to be able to correctly take into account its influence.

For this purpose, the positioning error is included as an additional degree of freedom in the calibration, which has already been known from the aforementioned dissertation. The measured optical path lengths $OPL_{gesamt\ [total]}$ are described by the following equation:

$$OPL_{total}(M,N,m,n) = W_Q(M,N,X,Y) + W_Q(m,n,x,y) + W_Q(\delta sx, \delta sy, \delta sz) \quad (1),$$

wherein M, N is the spatial coordinate on the source array 12; m, n the spatial coordinate on the camera 34; X, Y is a spatial coordinate (field angle) on a source reference plane 36; x, y is a spatial coordinate of a pixel reference plane 38; and $\delta sx$, $\delta sy$, $\delta sz$ are values of a faulty positioning of the reference sphere. For calibration, several measurements are preformed in different positions. In so doing, the positions of the reference sphere 35 are selected in such a manner that the total testing volume—i.e., both reference planes (namely values x, y and X, Y)—are covered in all field angles (i.e., values m, n and M, N).

For example, this may be accomplished in that, for each source 13, the sphere 35 is positioned in the null test once and then, in a second step, positioned slightly defocused. In the null test position, the complete source reference plane 36 is covered. In the event of a defocus, the complete pixel reference plane 38 is covered, as a result of which it is ensured that there is information for all areas.

The calibration is performed by way of the solution of an optimization problem. As a result, parameters describing the system are obtained, as well as positioning errors with which the reference object was positioned during the calibration.

However, this works only if all the variables of the system are linearly independent of each other and do not display linear dependencies relative to the positioning errors. However, this does not occur in the normal case.

A first disadvantage of the former solution for calibrating the tilted wave interferometer results from the reference system used for calibration. The known calibration describes the aberrations of the interferometer with the aid of two Black Boxes that are defined on two reference planes 36, 38 in the testing volume.

The path length of a beam that crosses the source reference plane 36 depends on the values M, N, X, Y applicable to said beam and can be described accordingly by a function dependent on one of these four variables, in particular by a four-dimensional polynomial. To this extent, the function is defined on the source reference plane.

Analogous thereto, the path length of a beam that crosses the pixel reference plane 38 is a function of the values m, n, x, y applicable to said beam and can be described, accordingly, by a function dependent on one of these four variables, in particular by a four-dimensional polynomial. To this extent, the function is defined on the pixel reference plane.

Each of these functions with the possible values of the respectively four parameters represents a mathematical model for these path lengths, said mathematical model being largely independent of the real structure of the interferometer. To this extent, these mathematical models are referred to as Black Box mathematical models in the present patent application.

In order to define the coordinate system on which the calibration is based, it is necessary to relate the position of the planes 36, 38 to the physically existing interferometer. In the previous solution this was achieved by six additional secondary conditions in the equation system. In so doing, three secondary conditions define the error positioning of a calibration sphere as the reference object in the measuring position in the null test of the source on the optical axis relative to zero. This sets the origin of the coordinate system in the center of this sphere at the time of calibration. In so doing, the position of this sphere is interferometrically adjusted so that it is located highly accurately on the optical axis. The position of the reference object is frequently—and will also hereinafter be—referred to as the sphere position.

In addition to the three translations, the three rotations must be defined. Until now, in order to define the rotation, the tilt terms of the wavefronts of the central source were defined on the optical axis in X-direction and Y-direction to a nominal value in order to define the rotation about the Y-axis and the X-axis. For the rotation about Z, the linear dependency of the tilt term in Y-direction on the source position in X-direction was defined to the nominal value (desired value).

The disadvantage of this known solution is a constrained divergence of calibration. This is the case in particular when, due to adjustment errors in the setup, there exists a tilt in the test wavefront. Frequently this cannot be detected directly because it may be compensated for by the reference wave.

Different therefrom, the present invention provides the following: In order to define the coordinate system, six secondary conditions N1 to N6 are included in the equation system, as is the case in the previous solution.

Figure 2:
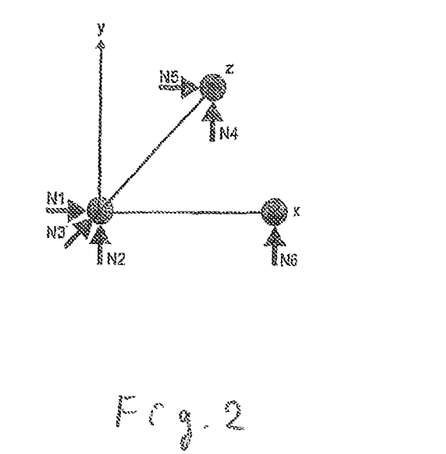
FIG. 2 a coordinate system that is defined by six secondary conditions in a calibration according to the invention.

FIG. 2 shows a left-handed Cartesian coordinate system that is set by six secondary conditions N1 to N6. Here, the z-direction is oriented in the direction of the optical axis 40 of FIG. 1.

For the three translations in x-, y- and z-directions, the first sphere position that is located on the optical axis 40 in the null test of the source is fixed in all three translation directions in that the coordinates of this position are respectively allocated one defined value, preferably the value zero. To accomplish this, the nominal location that preferably corresponds to the coordinate origin is moved to with the calibration object 22, which, however, can occur only with constrained accuracy. The first sphere position is located preferably on the optical axis of the interferometer that, in this case, coincides with the z-axis of the coordinate system. In principle, this is also possible in any other sphere position; however, preferably, the first sphere position is selected because it is positioned interferometrically and is then located relatively accurately on the optical axis.

In this point that is first moved to and that is necessarily subject to error in the testing volume, the deviations from the nominal position are defined to zero in that the x-, y- and z-coordinates of this point are allocated respectively one value, preferably respectively the value zero. This is done due to the secondary conditions N1 for the x-direction, the secondary condition N2 for the y-direction, and the secondary condition N3 for the z-direction. Inasmuch as the positioning system expands due to thermal influences, there is also formed—in addition to the incidental positioning error—a drift that increases in the course of the calibration. Thus, the testing volume—whenever another measuring position is selected, said measuring position being moved to only later—is shifted by the amount of this drift, which would result in a tilting of the measured result. In order to eliminate the three rotary degrees of freedom, two additional positions where the reference object is measured are introduced. In order to keep the drift as minimal as possible, they are included at the start of the calibration directly after the first measurement. The first of the two additional positions is also located on the optical axis but is defocused compared to the first measuring position.

In conjunction with this, a defocusing is understood to mean a shifting in the direction of the optical axis 40. The position (position of the sphere) of the calibration object 22 is fixed—in this measurement—via the secondary condition N5 in x-direction and via the secondary condition N4 in y-direction but remains free in z-direction. Consequently, the coordinate system is fixed in its rotation about the x- and y-axes. Based on the positioning errors of the positioning unit the orientation of the axes is indeed incidentally slightly rotated, which, however, does not have a greater influence on the measurement. The freedom in z-direction is necessary because the z-distance between the first two measurements is subject to an error. If these parameters were fixed, the system would be overdetermined. In a mechanical system, this would correspond to a distortion. In the present invention, these would lead to a deterioration of convergence.

Overall, the fixation of the coordinate system may be imagined as a type of fixed-free-bearing known from mechanics. In this case, a degree of freedom is likewise not fixed on the second bearing in order to prevent a distortion caused, for example, by thermal expansion. Other than in a fixed-free bearing, there—likewise—a rotation about the z-axis is not desirable in the coordinate system. In order to prevent this rotation, the overall third sphere position (i.e., the second of the two additional positions) which is located far out in x-direction in the testing volume, is fixed by a secondary condition N6 in y-direction. In so doing, a fixation is attained by the respective allocation of a fixed value for the respective coordinate in the respectively moved to position.

Consequently, FIG. 2 represents, overall, the fixation of the coordinate system. The origin is located in the first sphere position (fixation translation in x, y, z by N1 to N3); shown to the right is the third sphere position (prevention of a rotation about z due to N6). To the rear, there is the second sphere position 2 (prevention of a rotation about x, y due to N4 and N5). The fixations are indicated by arrows marked N1 to N6 which hold the position in these directions. As a result, the positioning error of the calibration object is defined to zero in the measuring positions in the direction of the secondary conditions N1 to N6. The coordinate system is clearly defined and not overdefined, so that positioning errors do not have a negative influence on the convergence of calibration.

In one exemplary embodiment for calibrating an interferometer the method comprises the following steps:

An optically smooth surface arranged in a testing space is illuminated with at least one object wave (test wave) and object waves that are reflected by the surface are superimposed on the detector with a reference wave that is coherent relative to one or more object waves so as to generate an interferogram. Initially, all possible object waves that reach into the testing space are parametrized as polynomial functions with coefficient Q of the optical path lengths between the light source and the source reference plane. Pixel waves moving out of the testing space through the entire imaging system exactly onto one camera pixel are parametrized as polynomial functions having coefficients P of the optical path lengths between the pixel reference plane and the detector. Once the coefficients P and Q are known, the optical path length to be expected for each object wave between the source up to each point in a detector plane is calculated for a known object in the testing space. In so doing, the pixel wave and the source wave Q are calculated for an ideal interferometer, and any deviations of a real interferometer from the ideal interferometer that also indicated aberrant coefficients P and Q are quantified.

The quantification is accomplished in that, initially, a selection of pixel-source combinations is made for one or more known calibration objects, that, for each coefficient P and Q of the associate optical path length, a simulation is performed as to how the infinitesimal changes of the respective coefficients affect the optical path lengths of the selected pixel-source combinations, and that these effects are then stored as characteristic path length changes of the coefficient. Subsequently, the real interferometer is used to measure the deviations of the optical path lengths relative to the ideal interferometer for the selected pixel-source combinations, and these deviations are represented as linear combination of the characteristic path length changes of the coefficients in the form of a linear equation system that is solved based on the coefficient deviations. The coefficient deviations are added to the coefficients of the ideal interferometer in order to obtain P and A of the real interferometer. Once the P and Q of the real interferometer are known, calibration is completed.

Figure 3:
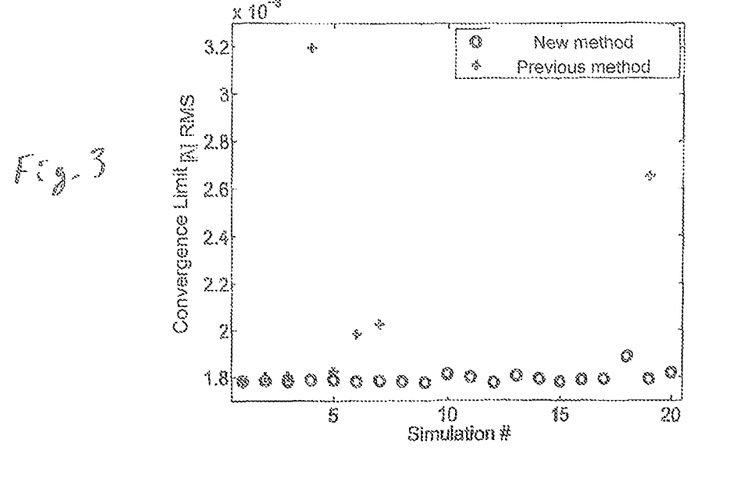
FIG. 3 a comparison of the convergence behavior of a calibration according to the invention and a known calibration.

FIG. 3 shows a comparison of the convergence behavior of a calibration according to the invention and a known calibration. In detail, FIG. 3 shows values of a convergence limit entered on the ordinate in multiples of thousandths of the wave length over the indirectly incidental adjustment error entered along the abscissa as the result of simulations. The numerical values 0 to 20 entered along the abscissa number the simulations that were performed. In so doing, the incidental adjustment error of the simulations #1 that corresponds to an error-free positioning increases linearly up to simulation #20, wherein the adjustment error corresponds to approximately 30 wavelengths. The circles result for the invention, whereas the crosses represent the known method. It is obvious that, with the invention, an almost uniformly small accuracy (root mean square deviation—RMS) of the calibration of less than two thousandths wavelengths results as the convergence limit, thus said accuracy being independent of the extent of the initial adjustment error. In contrast, the residual errors that occur in the known method are greater and scatter more. In conjunction with this it should be noted that it was not possible to achieve any convergence at all in the missing data points.

This means that the convergence behavior which is achieved by the new type of definition of the coordinate system is clearly better than that of the known type of calibration.

As has already been previously mentioned, the use of this type of calibration is not restricted to tilted wave interferometers. For example, it is also possible to calibrate a conventional interferometer that works with only one source or test wave, in order to, e.g., measure weak aspheres in the non-null test.

In this special case, the complexity of the polynomial description for the sources is reduced: Only the wavefront of the one source is described. Another advantage of this type of calibration is the greatly reduced requirement of positioning accuracy during measurement due to the knowledge of the retrace errors. As has been mentioned farther above, it is possible according to the invention to calibrate other measuring devices that have a testing volume and that require a definition of a coordinate system.

Hereinafter, an embodiment is presented with which additional errors can be compensated for, said errors being based on another error source: This other error source exists in a linear dependency between an error-displaying positioning of a measuring object used for the calibration and the aberrations of the interferometer from an ideal state that can basically occur in an interferometer.

As a result of faulty positioning of the calibration object in a measuring position, tilts, as well as minor components of higher-order terms, occur in case of any shifting in x-direction and/or y-direction. In the case of a shift in z-direction, mainly a defocus occurs, as well as minor components of mainly rotation-symmetrical higher-order terms. In both cases, these terms can be explained however by aberrations of the interferometers that are to be calibrated. Consequently, when viewing an individual measuring position, the algorithm cannot distinguish which of the two explanations—or which of the two possible causes—is applicable, thus making it impossible to correctly calibrate the system.

Until now, this linear dependency was resolved by aberration-theoretical contemplations regarding the progression of different polynomial terms in the field. Only a few parameters that could form in accordance with this theory were cleared for optimization. The disadvantage of this solution is that the calibration with constrained parameters will converge only when all optical components are adjusted extremely accurately, all components are perfect—i.e., no errors are contained in the surfaces—and that, furthermore, a total of only a few parameters are used in the Black Boxes.

This has several disadvantages. On the one hand, an adjustment that requires such accuracy is highly time-consuming and requires a great deal of experience. Moreover, aberrations that are not represented by the simplified assumptions of the theory can also not be calibrated, as a result of which the convergence of calibration is made worse. Due to the restriction to an overall small parameter space, the fit error in the Black Box polynomials is very high, thus preventing a calibration with interferometric accuracy of a fifth of the wavelength or better (i.e., with residual deviations that are even smaller).

Figure 4:
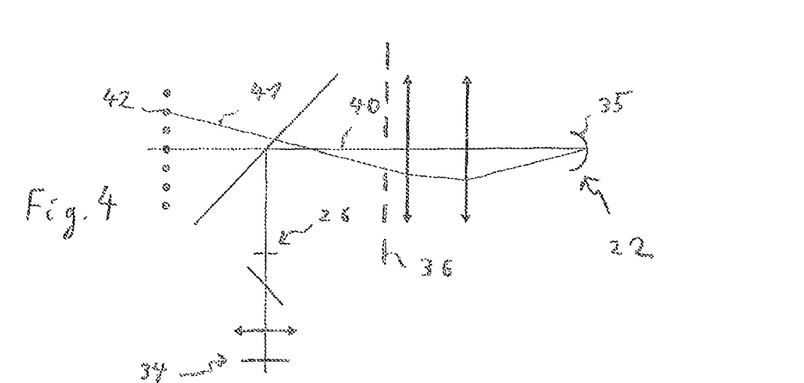
FIG. 4 the propagation of a main beam in the measuring device according to FIG. 1, under ideal conditions.

FIG. 4 first shows the propagation of a main beam 41 from a light source 42 via a reference sphere 35 to the camera 34. In conjunction with this, a main beam is understood to mean a beam that passes centrally through the diaphragm 26.

Figure 5:
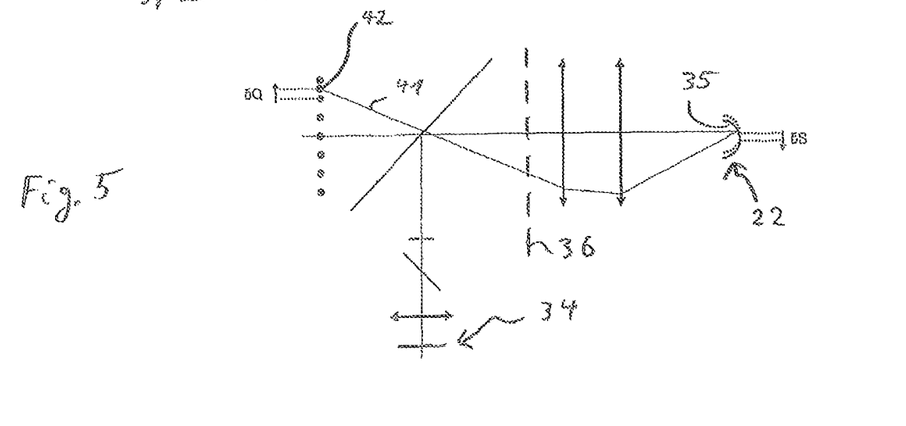
FIG. 5 the propagation of a comparable main beam with a not ideally positioned light source and a compensating shift of the measured object.

FIG. 5 shows the propagation of a comparable main beam 41 with a light source 42 that has been shifted by $\delta Q$. This results in a changed beam angle (tilt) in the source reference plane. FIG. 5 also shows that this error can be compensated for by shifting the calibration object 22 (reference sphere) by $\delta Q$, so that the tilted beam 41 also passes—like the main beam 41 in FIG. 5—centrally through the diaphragm 26. This means that the method can initially not differentiate the two beam propagations illustrated in FIGS. 4 and 5 by means of the measurement. This is an example of a linear dependency between the sphere position and the tilt term (the tilt, the filed angle) of a source. In view of the position of the main beam on the camera that should actually be defined by the tilt, it is not possible to distinguish between the two states.

The supplementary solution approach for eliminating this ambiguity consists in that additional measuring positions are introduced. These are selected in such a manner that each measurement contains information of several sources, which can be achieved by defocusing, namely a shifting of the calibration object in z-direction (along the optical axis 40). In this position, the tilt and defocus terms of the involved sources are related to each other. In order to cover the total testing volume, several such defocused measuring positions are required because—due to vignetting (shadowing of measuring light on the components of the setup)—it is not possible to integrate all the sources at the same time in one measurement. The defocused measuring positions are selected in such a manner that all sources are linked to each other piece by piece. The result is that the positioning errors are no longer linearly dependent on the calibration parameters, because they are linked between all positions of the sphere.

Inasmuch as also the sphere positions which are used for the definition of the coordinate system a co-linked, all the positions are related to the coordinate system and no longer display any dependency on system aberrations.

For this purpose, at least a part of the calibration objects 22 and the measuring positions used for the calibration are specified in such a manner that a measurement signal of the area/panel detector 34 generated in the alternating effect of the light of several light sources with a reference object, exhibits contributions of several light sources; and that the measuring positions in the testing volume represent nodal points of an imagined, coherent graph that consists of nodes and edges, wherein two nodal points are connected by an imagined edge precisely whenever contributions of at least one common light source are contained in the measurement signals that are generated in the two nodes acting as the measuring positions, and, furthermore, each light source of the light sources provides at least one contribution to a measurement signal; and that a measurement signal of the area/panel detector that comprises several individual detectors (e.g., pixels of a CCD chip) is composed of signal contributions of several individual detectors; and that the measuring positions in the testing volume represent nodal points of an imagined, coherent graph that consists of nodes and edges, wherein two nodal points are connected by an imagined edge whenever the measurement signals that are generated in the two nodes contain signal contributions of at least one common individual detector; and that, furthermore, each individual detector of the area/panel detector provides at least one contribution to a measurement signal.

In addition to the problems described hereinabove, there exists another source for error in the interferometric measurement of a sample. This error source relates to a type of scaling of the entire testing volume. The error source consists in that, initially it is not possible to make a distinction between the following two states:

A first state is distinguished in that the tilt of the wavefront of all sources in the direction of the optical axis—meaning the angle between these wavefronts and the optical axis—deviates from the nominal value of the tilt and the calibration object was either perfectly positioned in all its measurements or its position was only incidentally scattered (but without linear error along the axes of the positioning unit).

A second state is distinguished in that the tilt of the wavefront of all sources in the direction of the optical axis corresponds to the nominal value of the tilt, and the calibration object was shifted in all measurements in the null test of the sources in the direction of the optical axis by an amount which is linearly dependent on the distance from the optical axis.

In the first state 1, the calibration positions in the null test, as well as the defocused measuring positions, have all been perfectly moved to and display only incidental scattering. In the second state, the calibration positions are scaled in the null test. Thus, they display an error that is, e.g., proportional to the distance from the optical axis.

In the defocused calibration positions, this scaling is automatically compensated for by an adaptation of the defocus and tilt parameters and can thus, likewise, not be detected in these measurements. Consequently, it is not possible with the aid of the present calibration information to distinguish between these two states. In a real system, both states will occur with a certain frequency, which is why it is necessary for a successful calibration to be able to distinguish between these two states. Until now, there was no solution for this.

A distinction can be successfully made in the following preferred embodiments displaying the following features:

The signal which allows the distinction between the said first state and the said second state is greater whenever the shift between the various calibration positions in z-direction is greater and whenever the effective numerical aperture (NA) of the evaluatable measuring ranges in a single source is greater. If the calibration object is defocused more in one position, the shift in z-direction indeed increases, but, at the same time, the effective NA decreases. In order to solve the problem, a possibility must be found for shifting the calibration object as far as possible in order to decrease the NA. This can be achieved in that not only one calibration sphere but several (at least two) spheres having a greatest possible radii difference are used. The additional sphere positions are then measured in defocused positions where several sources are visible and are additionally included in the calibration algorithm. Furthermore, at least four times four sources must be visible in each measurement because—due to lateral shifting—the tilt, i.e., the linear term and—due to defocusing—the focus, i.e., the square term, can be adjusted. If there exist only three measuring points, the measured second-degree function can always be explained by shifting in x, y and z, which is no longer possible in the case of four times four measuring points. The signal becomes better the more sources can be seen in the measurement. In the simplest case, two different radii are necessary for defining the degree of freedom. Inasmuch as, however, also the radii of the spheres contribute to scaling and can be determined only with finite accuracy, it is recommended that—for a real calibration—more than only two different sphere radii be used, so that the error caused by faulty radii will average out.

It is also possible to implement the different sphere radii in a diffractive element, wherein different orders of diffraction order are utilized.

The invention claimed is:

1. Method for calibrating a measuring device (10), the method comprising:
    moving, with finite accuracy and thus with positioning error, a reference object to at least three measuring positions located in a testing volume (24) of the measuring device and distinguishable by spatial and/or angular coordinates,
    generating measurement signals at the respective measuring positions, and
    determining parameters of a mathematical model of the measuring device from the measurement signals and the spatial and/or angular coordinates, including deriving a coordinate system, to which coordinates of points of the testing volume relate, from the measuring positions moved to with error by associating predetermined coordinate values with exactly six coordinates of at least three of the measuring positions,
    wherein the associating predetermined coordinate values comprises:
    assigning a first set of three predetermined coordinate values (0/0/0) to a first measuring position of the at least three measuring positions and defining error caused by moving with error into the first measuring position to zero by a first set of three secondary conditions (N1, N2, N3) within an equation system characterizing the measuring device,
    assigning a second set of three predetermined coordinate values (0/0/1) to a second measuring position of the at least three measuring positions and defining error caused by moving with error into the second measuring position to zero by a second set of two additional secondary conditions (N4, N5) in the equation system, and
    assigning a third set of three predetermined coordinate values (1/0/0) to a third measuring position of the at least three measuring positions and defining error caused by moving with error into the third measuring position to zero by a third set of one secondary condition (N6) in the equation system.

2. Method according to claim 1 further comprising:
    wherein the reference object is one of at least some reference objects, and the method further comprising predetermining and using the at least some reference objects together with at least some of the at least three measuring positions for calibration to create the measurement signal using light from at least two light sources interacting with the reference object associated with a detector,
    wherein the measuring positions in the testing volume represent nodal points of an imagined, coherent graph that consists of nodes and edges, wherein two nodal points are connected by one imagined edge precisely whenever the measurement signals generated in the two nodes contain contributions from at least one common light source, and
    wherein the method further comprises:
    providing from each light source of the light sources at least one contribution to at least one of the measurement signals, and
    composing at least one of the measurement signals of the detector, comprising several individual detectors, using signal contributions from several individual detectors, and wherein the measuring positions in the testing volume represent nodal points of an imagined, coherent graph that consists of nodes and edges, wherein two nodal points are connected by an imagined edge precisely whenever the measuring signals generated in the two nodes contain signal contributions of at least one common individual detector, and
    each individual detector of the several individual detectors providing at least one contribution to at least one of the measurement signals.

3. Method according to claim 1 further comprising:
    using one or more reference objects that allow measuring positions at different positions in the testing volume.

4. Method according to claim 1, wherein the measuring device is an interferometer.

5. Method according to claim 4, wherein the interferometer is an interferometer that works with only one test wave that is generated by a single light source.

6. Method according to claim 4, wherein the interferometer is a Tilted Wave Interferometer.

7. Method according to claim 1, wherein the measuring device is a deflectometric measuring device.

8. Measuring device adapted to perform a method according to claim 1, the measuring device comprising at least two light sources (13) and a detector (34).

9. Measuring device according to claim 8 that is configured as an interferometer comprising a point light source array (12) of light sources (13) including the at least two light sources (13), a beam splitter (14), a collimator (16), an objective lens (18), a positioning unit (20) configured to move a measuring object (22) in a testing volume (24) of the interferometer, a diaphragm (26), a reference light source (28), a second beam splitter (30), imaging optics (32), and the detector (34) including a camera comprising light-sensitive pixels.

10. Method according to claim 2, wherein the measuring device is one of a group comprising: an interferometer, an interferometer that works with only one test wave that is generated by a single light source, a Tilted Wave Interferometer, a deflectometric measuring device, and a tactile measuring device.

11. Measuring device adapted to perform a method according to claim 2, the measuring device comprising at least two light sources (13) and a detector (34).

12. Measuring device according to claim 11 that is configured as an interferometer comprising a point light source array (12) of light sources (13) including the at least two light sources (13), a beam splitter (14), a collimator (16), an objective lens (18), a positioning unit (20) configured to move a measuring object (22) in a testing volume (24) of the interferometer, a diaphragm (26), a reference light source (28), a second beam splitter (30), imaging optics (32), and the detector (34) including a camera comprising light-sensitive pixels.

13. Method according to claim 3, wherein the measuring device is one of a group comprising: an interferometer, an interferometer that works with only one test wave that is generated by a single light source, a Tilted Wave Interferometer, and a deflectometric measuring device.

14. Method according to claim 3, wherein the using the one or more reference objects allow measuring positions at different positions in the testing volume including curved surfaces with different-size radii of curvature or diffractive optics that reconstruct different wavefronts.

15. Measuring device adapted to perform a method according to claim 3, the measuring device comprising at least two light sources (13) and a detector (34).

16. Measuring device according to claim 15 that is configured as an interferometer comprising a point light source array (12) of light sources (13) including the at least two light sources (13), a beam splitter (14), a collimator (16), an objective lens (18), a positioning unit (20) configured to move a measuring object (22) in a testing volume (24) of the interferometer, a diaphragm (26), a reference light source (28), a second beam splitter (30), imaging optics (32), and the detector (34) including a camera comprising light-sensitive pixels.

17. Method according to claim 1, wherein the first measuring position and the second measuring position are arranged on the optical axis (40).

18. Method according to claim 1, wherein in the first measuring position the first secondary condition (N1) defines a positioning error in x-direction to zero, wherein the second secondary condition (N2) defines a positioning error in y-direction to zero and wherein the third secondary condition (N3) defines a positioning error in z-direction to zero.

19. Method according to claim 1, wherein in the second measuring position the fourth secondary condition (N4) defines a positioning error in y-direction to zero, and wherein the fifth secondary condition (N5) defines a positioning error in x-direction to zero.

20. Method according to claim 19, wherein in the second measuring position the positioning error in z-direction is not defined to zero.

21. Method according to claim 1, wherein in the third measuring position the sixth secondary condition (N6) defines a positioning error in y-direction to zero.

22. Method according to claim 21, wherein in the third measuring position a positioning error in the x-direction and in the z-direction is not defined to zero.

* * * * *